United States Patent
Tsou et al.

(10) Patent No.: US 10,878,559 B2
(45) Date of Patent: Dec. 29, 2020

(54) METHOD AND SYSTEM FOR EVALUATING EFFICIENCY OF MANUAL INSPECTION FOR DEFECT PATTERN

(71) Applicant: UTECHZONE CO., LTD., New Taipei (TW)

(72) Inventors: Chia-Chun Tsou, New Taipei (TW); Arulmurugan Ambikapathi, New Taipei (TW); Chien-Chung Lin, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 55 days.

(21) Appl. No.: 16/455,725

(22) Filed: Jun. 27, 2019

(65) Prior Publication Data

US 2020/0005446 A1 Jan. 2, 2020

(30) Foreign Application Priority Data

Jun. 29, 2018 (TW) .............................. 107122606 A

(51) Int. Cl.
*G06T 7/00* (2017.01)
*G06F 11/34* (2006.01)

(52) U.S. Cl.
CPC .......... *G06T 7/001* (2013.01); *G06F 11/3438* (2013.01); *G06T 2207/30141* (2013.01); *G06T 2207/30148* (2013.01); *G06T 2207/30164* (2013.01); *G06T 2207/30168* (2013.01)

(58) Field of Classification Search
CPC ........... G06T 7/001; G06T 2207/30164; G06T 2207/30141; G06T 2207/30148; G06T 2207/30168; G06F 11/3438
See application file for complete search history.

(56) References Cited

U.S. PATENT DOCUMENTS

2003/0228049 A1* 12/2003 Asai ..................... G06T 7/001
382/145
2014/0185918 A1* 7/2014 Hirai ..................... H01L 22/12
382/145

* cited by examiner

*Primary Examiner* — Ruiping Li
(74) *Attorney, Agent, or Firm* — JCIPRNET

(57) ABSTRACT

A method for evaluating an efficiency of a manual inspection for a defect pattern is provided according to an embodiment of the disclosure, which comprises: enabling an evaluation program; loading a test image automatically by the enabled evaluation program and displaying the test image in a user interface; detecting a user behavior of a user after the user watches the test image; generating original data according to the user behavior, wherein the original data reflects at least one of whether the user identifies the defect pattern in the test image and a type of the defect pattern identified by the user; and performing a quantitative operation on the original data to generate evaluation data corresponding to the efficiency of the manual inspection, wherein the evaluation data reflects an evaluation result corresponding to the efficiency of the manual inspection.

18 Claims, 4 Drawing Sheets

| Image number | Image name | Correct answer | User's answer | Result | Timeout | Answer order | Total number of images | 10 | Correct number | 2 | Error rate | 80.% |
|---|---|---|---|---|---|---|---|---|---|---|---|---|
| 1 | Defect_0.bmp | Defect | Defect | Correct | FALSE | 3 | Total number of Defect | 5 | Error number of Defect | 3 | Skip Rate | 60.% |
| 2 | Defect_1.bmp | Defect | Normal | Defect_Miss | FALSE | 7 | Total number of Normal | 5 | Error number of Normal | 5 | Overkill Rate | 100.% |
| 3 | Defect_2.bmp | Defect | Defect | Correct | FALSE | 4 | | | | | | |
| 4 | Defect_3.bmp | Defect | Normal | Defect_Miss | FALSE | 9 | | | | | | |
| 5 | Defect_4.bmp | Defect | Normal | Defect_Miss | FALSE | 6 | | | | | | |
| 6 | Normal_0.bmp | Normal | Defect | Normal_Miss | FALSE | 8 | | | | | | |
| 7 | Normal_1.bmp | Normal | Defect | Normal_Miss | FALSE | 10 | | | | | | |
| 8 | Normal_2.bmp | Normal | Defect | Normal_Miss | FALSE | 2 | | | | | | |
| 9 | Normal_3.bmp | Normal | Defect | Normal_Miss | FALSE | 5 | | | | | | |
| 10 | Normal_4.bmp | Normal | Defect | Normal_Miss | FALSE | 1 | | | | | | |

310

| Image number | Image name | Correct answer | User's answer | Result | Timeout | Answer order | Total number of images | Total number of Defect | Total number of Normal | Correct number | Error number of Defect | Error number of Normal | Error rate | Skip Rate | Overkill Rate |
|---|---|---|---|---|---|---|---|---|---|---|---|---|---|---|---|
| 1 | Defect_0.bmp | Defect | Defect | Correct | FALSE | 3 | 10 | 5 | 5 | 2 | 3 | 5 | 80.% | 60.% | 100.% |
| 2 | Defect_1.bmp | Defect | Normal | Defect_Miss | FALSE | 7 | | | | | | | | | |
| 3 | Defect_2.bmp | Defect | Defect | Correct | FALSE | 4 | | | | | | | | | |
| 4 | Defect_3.bmp | Defect | Normal | Defect_Miss | FALSE | 9 | | | | | | | | | |
| 5 | Defect_4.bmp | Defect | Normal | Defect_Miss | FALSE | 6 | | | | | | | | | |
| 6 | Normal_0.bmp | Normal | Defect | Normal_Miss | FALSE | 8 | | | | | | | | | |
| 7 | Normal_1.bmp | Normal | Defect | Normal_Miss | FALSE | 10 | | | | | | | | | |
| 8 | Normal_2.bmp | Normal | Defect | Normal_Miss | FALSE | 2 | | | | | | | | | |
| 9 | Normal_3.bmp | Normal | Defect | Normal_Miss | FALSE | 5 | | | | | | | | | |
| 10 | Normal_4.bmp | Normal | Defect | Normal_Miss | FALSE | 1 | | | | | | | | | |

METHOD AND SYSTEM FOR EVALUATING EFFICIENCY OF MANUAL INSPECTION FOR DEFECT PATTERN

CROSS-REFERENCE TO RELATED APPLICATION

This application claims the priority benefits of Taiwan application serial no. 107122606, filed on Jun. 29, 2018. The entirety of the above-mentioned patent application is hereby incorporated by reference herein and made a part of this specification.

BACKGROUND

Technical Field

The disclosure relates to an efficiency evaluation technology, particularly to a method and a system for evaluating an efficiency of a manual inspection for a defect pattern.

Description of Related Art

Before an electronic component is sent out from the factory, the electronic component is usually inspected with visual confirmation by a human employee, so as to determine whether a defect is existed in the electronic component. Based on some improved technologies, Artificial Intelligence (AI) is gradually designed to support an ability of automatically inspecting defects to reduce the work loading of the human employee. However, there is no solution for evaluating an efficiency of a manual inspection for a defect pattern performed by human employee, such that an efficiency of the automatic inspection for the defect pattern performed by AI cannot be easily compared to the efficiency of the manual inspection for the defect pattern in quantitative means.

SUMMARY

The disclosure provides a method and a system for evaluating an efficiency of a manual inspection for a defect pattern, which are capable of generating quantitative evaluation data to reflect an evaluation result corresponding to the efficiency of the manual inspection for the defect pattern.

A method for evaluating an efficiency of a manual inspection for a defect pattern is provided according to an embodiment of the disclosure, which comprises: enabling an evaluation program; loading a test image automatically by the enabled evaluation program and displaying the test image on a user interface; detecting a user behavior of a user after the user watches the test image; generating original data according to the user behavior, wherein the original data reflects at least one of whether the user identifies the defect pattern in the test image and a type of the defect pattern identified by the user; and performing a quantitative operation on the original data to generate evaluation data corresponding to the efficiency of the manual inspection, wherein the evaluation data reflects an evaluation result corresponding to the efficiency of the manual inspection.

A system for evaluating an efficiency of a manual inspection for a defect pattern is provided according to an embodiment of the disclosure, which comprises a display, a memory and a processor coupled to the display and the memory. The processor enables an evaluation program. The enabled evaluation program loads a test image to the memory automatically. The display displays the test image on a user interface. The processor detects a user behavior of a user after the user watches the test image. The processor generates original data according to the user behavior, wherein the original data reflects at least one of whether the user identifies the defect pattern in the test image and a type of the defect pattern identified by the user. The processor performs a quantitative operation on the original data to generate evaluation data corresponding to the efficiency of the manual inspection, wherein the evaluation data reflects an evaluation result corresponding to the efficiency of the manual inspection.

On the basis above, after an evaluation program is enabled, the evaluation program may automatically loading a test image and display the test image on a user interface. By detecting a user behavior of a user after the user watches the test image, original data reflects whether the user identifies a defect pattern in the test image and/or a type of the defect pattern identified by the user may be generated. After a quantitative operation is performed on the original data, evaluation data which reflects an evaluation result corresponding to an efficiency of a manual inspection for the defect pattern may be generated. As such, the disclosure is capable of evaluating the efficiency of the manual inspection for the defect pattern in a quantitative means. Furthermore, the generated quantitative data may be further configured to be analyzed and compared to a quantitative efficiency of an automatic inspection for such defect pattern.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3 is a schematic diagram of evaluation data according to an embodiment of the disclosure.

DESCRIPTION OF THE EMBODIMENTS

Figure 1:
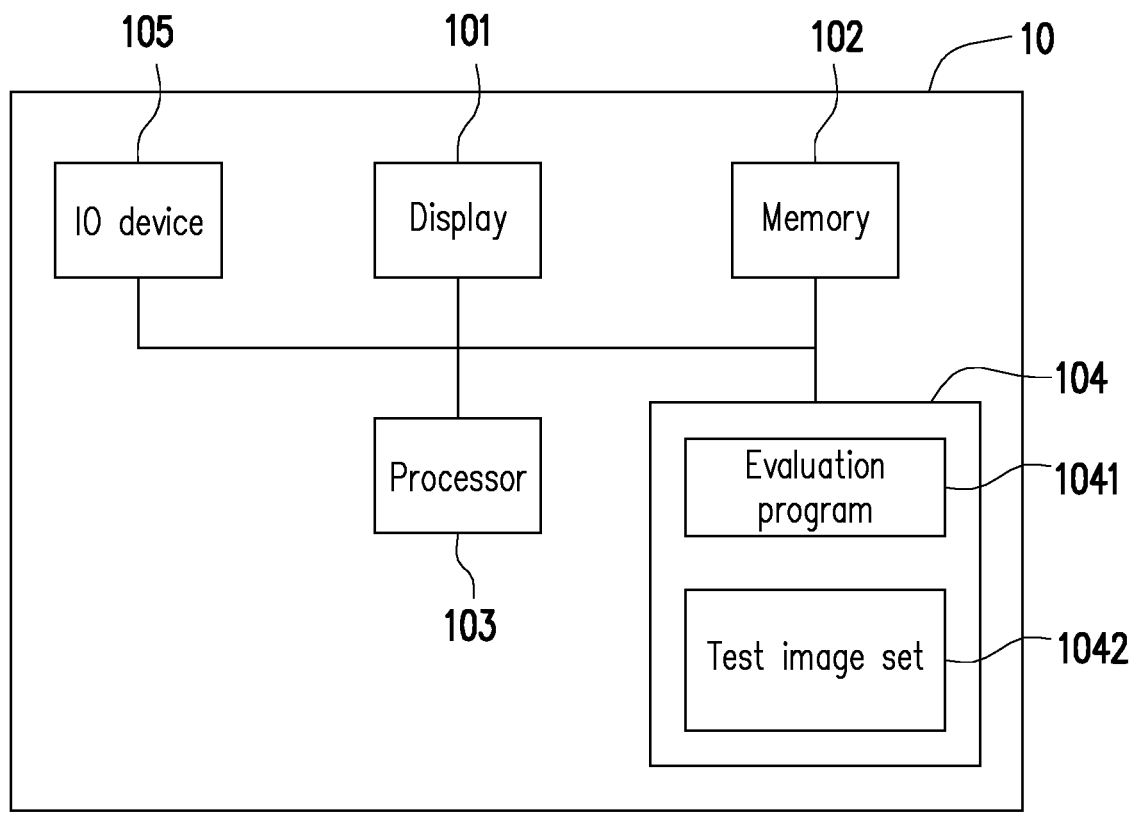
FIG. 1 is a schematic diagram of a system for evaluating an efficiency of a manual inspection for a defect pattern according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts. Furthermore, it is noted that the term "a" or "an" entity refers to one or more of that entity. As such, the terms "a" (or "an"), "one or more" and "at least one" can be used interchangeably herein.

FIG. 1 is a schematic diagram of a system for evaluating an efficiency of a manual inspection for a defect pattern according to an embodiment of the disclosure. Referring to FIG. 1, a system (also referred to as an evaluation system) 10 is configured to evaluate an efficiency of a manual inspection for a defect pattern. The defect pattern may reflect a defect on a surface of a workpiece, such as a semiconductor chip, a wafer, a panel, a circuit board (e.g., a printed circuit board (PCB), a flexible printed circuit (FPC), a ceramic PBC), and so on. For example, the defect may be a color change of a metal or other material, a black line, an ink stain, an exposed material, a light spot, a dirty spot or a scratch. Furthermore, the manual inspection for the defect pattern is referred to as a manual inspection performed by a human employee (also referred to as a user) for inspecting whether a defect pattern is in an image of an object (e.g., the workpiece) and/or determining a type of the defect pattern in the image. Comparing to the manual inspection of the defect pattern, an automatic inspection of the defect pattern is referred to as an automatic inspection automatically performed by a defect inspection device for inspecting the defect pattern in the image. The system 10 may be implemented by an electronic device such as a smart phone, a tablet computer, a desktop computer, a notebook, an industrial computer, a server equipment and so on.

Generally, after an image of a surface of an object is obtained by photographing the object with an optical lens, patterns of electronic components may be presented in this image. A pattern of a defect (i.e., a defect pattern) may also be included in this image. Some types of defect patterns may be easily to be detected by the manual inspection and by the automatic inspection. However, some types of defect patterns may be not easily to be detected by the manual inspection and/or by the automatic inspection. Therefore, if an efficiency of an automatic inspection for a defect pattern performed by an automatic defect inspection device is evaluated only according to an inspection accuracy of the automatic defect inspection device itself, the evaluation result may be inaccurate because some types of defect patterns may not be easily identified even by a senior employee with lots of experiences. In an embodiment, if the efficiency of the automatic inspection for the defect pattern performed by the automatic defect inspection device is compared to an efficiency of a manual inspection for such defect pattern, an efficiency evaluation result meeting the actual situation may be obtained. In an embodiment, the system 10 may generate quantitative data which reflects the efficiency of a manual inspection for a defect pattern, so as to provide the suitable comparison basis for comparing and analyzing the efficiency of the automatic inspection by the automatic defect inspection device.

The system 10 includes a display 101, a memory 102, a processor 103, a storage circuit 104 and an input/output (IO) device 105. The processor 103 is coupled to the display 101, the memory 102, the storage circuit 104 and the IO device 105. The display 101 may be a liquid crystal display (LCD), a light-emitting diode (LED) display, an organic light emitting display (OLED), an electro-phoretic display (EPD) or a display with other type. In an embodiment, the display 101 may be replaced by a projector or an image display device with other type.

The processing circuit 103 may be a central processing unit (CPU), a graphic processing unit (GPU), micro-processor, digital signal processor (DSP), programmable controller, application specific integrated circuit (ASIC), programmable logic device (PLD) with common use or specific use, or other similar device, or combination of these devices. The processing circuit 103 may be in charge of the entire or part executions of the system 10.

The memory 102 may be a volatile storage medium such as a random access memory (RAM). The storage circuit 104 may be a non-volatile storage medium such as a read only memory (ROM), a solid state disk (SSD), or a hard disk drive (HDD). The IO device 105 may include signal output devices such as a speaker, and/or signal input devices such as a mouse, a keyboard, a touch pad, a remote controller, a microphone, an optical lens, a brain wave detector and so on. In an embodiment, the IO device 105 may include signal input/output devices such as a touch screen and/or a network interface card.

The storage circuit 104 stores an evaluation program 1041. The evaluation program 1041 is configured to evaluate an efficiency of a manual inspection for a defect pattern. The processor 103 may enable the evaluation program 1041. For example, the processor 103 may load the evaluation program 1041 to the memory 102 and execute the evaluation program 1041. The enabled evaluation program 1041 may automatically load one or more test images from the storage circuit 104 to the memory 102 and display the test image in a user interface. The user interface may be displayed by the display 101.

In an embodiment, the storage circuit 104 stores a test image set 1042. The test image set 1042 includes at least one non-defect image and at least one defect image. The non-defect image and the defect image may be collectively referred to as the candidate test images. The defect image includes a defect pattern, and the non-defect image does not include any defect pattern. It is noted that, the number of the test image set 1042 may be one or more, and each test image set 1042 may include a plurality of candidate test images. One candidate test image may be a real image obtained by photographing an object with an optical lens or a simulation image obtained by simulating the operation of photographing an object with an optical lens. Furthermore, a defect pattern in a specific defect image may reflect a defect really existing in the surface or may be added into the defect image randomly by performing an image processing of the processor 103.

After the evaluation program 1041 is enabled, the processor 103 may select one specific test image set 1042 from the storage circuit 104. The processor 103 may randomly select at least one candidate test image (also referred to as a first candidate test image), from the candidate test images of the select test image set 1042, which is served as the test image and then display the test image in the user interface.

In an embodiment, in a manual inspection operation, a ratio of a number of the defect image to a number of the non-defect image in the displayed test images may be 30% to 60%. Taking 30% as an example, it is assumed that 10 test images is displayed in the entire manual inspection operation, and 3 defect images and 7 non-defect images may be included in this 10 test images. The processor 103 may select the candidate test images from the test image set 1042 according to the adopted ratio of the defect image and the non-defect image.

After the test image is displayed in the user interface, the processor 103 may detect a user behavior of a user by the IO device 105 after the user watches the test image. For example, the processor 103 may detect signal, such as a face motion (e.g., the positions of the eye balls), a body motion, a voice and/or a brain ware of the user, which presents the corresponding user behavior.

In an embodiment, the processor 103 may display at least one operation object in the user interface. For example, the operation object may include at least one button and/or at least one message input region and so on. The processor 103 may detect the user behavior corresponding to the operation object by the IO device 105. In other words, the user may operate the operation object in the user interface by changing face motion, body motion, voice or brain wave and so on.

In an embodiment, the processor 103 may provide time information which reflects an answering remaining time corresponding to the test image. For example, the time information may be output in a form of voice by the IO device 105 or displayed in the user interface.

Figure 2:
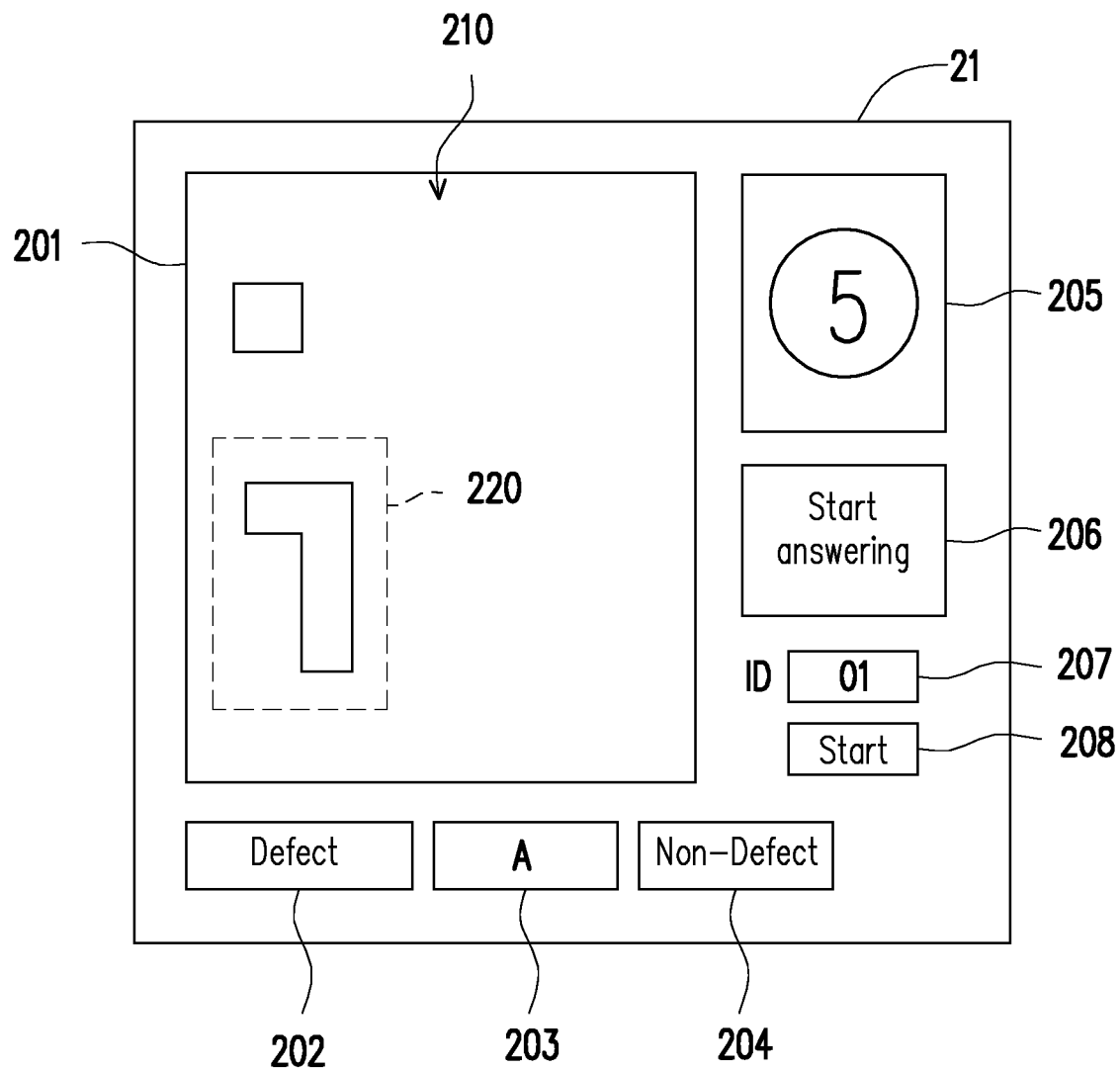
FIG. 2 is a schematic diagram of a user interface according to an embodiment of the disclosure.

FIG. 2 is a schematic diagram of a user interface according to an embodiment of the disclosure. Referring to FIG. 1 and FIG. 2, a user interface 21 includes an image display region 201, a button 202 and a button 204. The image display region 201 is configured to display a test image 210. In this embodiment, the test image 210 is a defect image which includes a defect pattern 220. However, in another embodiment, if the displayed test image is a non-defect image, then the displayed test image may not include any defect pattern. In a preset time range (e.g., 5 seconds), a user may watch the test image 210 displayed in the image display region 201 and identify whether any defect pattern exists in the test image 210 and/or a type of the identified defect pattern by a manual identification.

If a defect pattern (e.g., the defect pattern 220) in the test image 210 is identified by the user after the user watch the test image 210, the user may perform a user behavior corresponding to a trigger of the button 202. Taking the IO device 105 including a mouse as an example, the user may operate the mouse to select the button 202 to reflect that a defect pattern in the test image 210 is identified by the user. Alternatively, if the user does not identify the defect pattern 220 in the test image 210, the user may perform a user behavior corresponding to a trigger of the button 204. For example, the user may operate the mouse to select the button 204 to answer that there is no defect image being identified in the test image 210.

In an embodiment, the user interface 21 may further include a defect type input region 203. The defect type input region 203 is configured to receive a type of the identified defect pattern in the test image from the user. For example, if the user identifies that the defect pattern 220 is a type-A defect, the user may input type-A to the defect type input region 203 through the IO device 105.

In an embodiment, the user interface 21 may further include a time reminding region 205. The time reminding region 205 is configured to display the time information which reflects an answering remaining time (e.g., 5 seconds) corresponding to the current test image 210. During the answering remaining time, the user must finish the selection corresponding to one of the buttons 202 and 204. In an embodiment, if the selection corresponding to any one of the buttons 202 and 204 is not detected within the answering remaining time, one of the buttons 202 and 204 may be randomly triggered to ensure that the selection is fair when the user does not know the correct answer.

In an embodiment, the user interface 21 may further include an assistance information display region 206. The assistance information display region 206 is configured to display assistance information which provides information related to the manual inspection operation currently executed. For example, the assistance information may reflect that a new test image 210 is displayed in the image display region 201 and the user should start answering.

In an embodiment, the user interface 21 further include an authentication input region 207 and a button 208. The authentication input region 207 is configured to receive authentication information from the user, such as an employee number (e.g., 01) of the user. After the authentication information is input, the user may select the button 208 through the IO device 105 to start answering. For example, after the button 208 is triggered, the image display region 201 starts displaying the test image 210.

In an embodiment, after one of the buttons 202 and 204 is triggered, the processor 103 may determine that a manual inspection operation corresponding to the test image 210 is finished by the user and load a next test image. The loaded test image may be sequentially displayed in the image display region 201. Furthermore, if the user finishes the entire manual inspection operation corresponding to all of the test images, the processor 103 may close the user interface 21.

It is noted that, the user interface 21 of FIG. 2 is merely an example and may be adjusted. For example, in another embodiment, more or less operation objects and/or message regions may be configured in the user interface, which is not limited by the disclosure. Furthermore, each operation object and message region may be configured with other functions, which is not limited by the disclosure.

After the user behavior is detected, the processor 103 may generate original data according to the detected user behavior. The original data reflects whether a defect pattern in the test image is identified by the user and/or a type of the defect pattern identified by the user. Taking FIG. 2 as an example, the original data may be generated according to whether the buttons 202 and 204 are triggered and/or the input type of a defect pattern in the defect type input region 203. Then, the processor 103 may perform a quantitative operation on the original data to generate evaluation data corresponding to an efficiency of a manual inspection for the defect pattern. For example, the processor may perform logical operations on the original data to generate the quantitative evaluation data. The quantitative evaluation data reflects an evaluation result corresponding to the efficiency of the manual inspection for the defect pattern.

In an embodiment, the quantitative evaluation data includes at least one of consistency information, accuracy information, skip rate information and overkill rate information. The consistency information reflects a consistency of the determinations for the defect pattern in the same test image in multiple manual inspection operations for the same user. The accuracy information reflects a correct answering rate for identifying the defect patterns by the user after the entire manual inspection operation is finished. The skip rate information reflects a skip rate for identifying the defect patterns by the user after the entire manual inspection operation is finished. For example, the skip rate information may reflect a ratio of a total number of defect images not being identified as having the defect pattern by the user to a total number of the test images. The overkill rate information reflects an overkill rate for identifying the defect patterns by the user after the entire manual inspection operation is finished. For example, the overkill rate information may reflect a ratio of a total number of non-defect images being identified as having the defect pattern by the user to the total number of the test images. Furthermore, more types of information may be included in the evaluation data to further reflect the evaluation result of the efficiency of the manual inspection for the defect pattern.

FIG. 3 is a schematic diagram of evaluation data according to an embodiment of the disclosure. Referring to FIG. 1 and FIG. 3, evaluation table 310 may be generated and stored to the storage circuit 104 according to the detected user behavior. The evaluation table 310 is configured to record the original data and/or the quantitative evaluation data corresponding to the efficiency of the manual inspection which is generated according to the original data.

In this embodiment, evaluation table 310 records original data for evaluating the efficiency of the manual inspection for the defect pattern, such as Image number which reflects the image number of each test image, Image name which reflects the image name of each test image, Correct answer which reflects whether each test image includes a defect pattern actually, User's answer which reflects that the user identified whether each test image includes the defect pattern, Result which reflects the correctness of the user's answer for each test image, Timeout which reflects whether a timeout occurs when answering by the user corresponding to each test image, and Answer order which reflects the displaying order (i.e., an answering order) of these test images in the manual inspection operation. The original data may be directly recorded and/or be obtained by a comparison operation. For example, the processor 103 may compare the data input by the user to the correct data corresponding to the test images, so as to obtain the correctness of the answer input by the user regarding whether each test image has a defect pattern and/or the type of the defect pattern identified by the user. According to the original data, the quantitative evaluation data corresponding to the efficiency of the manual inspection may be obtained.

According to the original data recorded in the evaluation table 310, the following information may be obtained. The user sequentially performs the manual inspections corresponding to the 10 test images with the image numbers of 10, 8, 1, 3, 9, 5, 2, 6, 4 and 7. Each of the test images with the image numbers of 1 to 5 is a defect image having a defect pattern. Each of the test image with the image numbers of 6 to 10 is a non-defect image not having any defect pattern. According to the detected user behavior, the user identified that each of the test images with the image numbers of 1, 3 and 6 to 10 has a defect pattern, and the user identified that each of the test images with the image numbers of 2, 4 and 5 does not have any defect pattern. The inspection result of the user regarding whether the test images with image numbers of 1 and 3 has defect patterns is correct, and the inspection result of the user regarding whether the test images with image numbers of 2 and 4 to 10 has defect patterns is wrong. Furthermore, none of timeout event is occurred when the user performs the manual inspection for the 10 test images. The processor 103 may obtain the information above related to the performed manual inspections according to the original data. The processor 103 may process the original data to obtain the evaluation data according to a default rule. For example, the processor 103 may use specific algorithms and/or lookup tables to obtain the corresponding evaluation data.

In this embodiment, the evaluation data recorded in the evaluation table 310 includes a total number of test images (i.e., Total number of images=10), a total number of defect images (i.e., Total number of Defect=5) a total number of normal images (i.e., Total number of Normal=5), the number of correct answers (i.e., Correct number=2), the number of wrong answers regarding defect images (i.e., Error number of Defect=3), the number of wrong answers regarding non-defect images (i.e., Error number of Normal=5), an entire error rate (i.e., Error rate=80%), a skip rate (i.e., Skip rate=60%) and an overkill rate (i.e., Overkill rate=100%). These evaluation data may reflect the evaluation result corresponding to the efficiency of the manual inspection of the defect pattern in a quantitative way.

It is noted that, the table information 310 of FIG. 3 is merely an example and may be adjusted. For example, in another embodiment, original data with other types and/or evaluation data with other types used for evaluating the efficiency of the manual inspection for the defect pattern may also be recorded.

In an embodiment, after the evaluation data reflecting the efficiency of the manual inspection for the defect pattern is obtained, the evaluation data may be used in a quantitative difference analysis with an efficiency of an automatic inspection for the defect pattern. For example, the automatic inspection (also referred to as a machine inspection) for the defect pattern may be performed by an automatic defect inspection device. For example, the defect inspection device may include a trained neural network architecture or other artificial intelligence architecture, so as to perform an automatic inspection for a defect pattern in an image of an object.

Taking an embodiment of FIG. 3 as an example, if the 10 test images are further used for evaluating the efficiency of the automatic inspection for the defect pattern of the defect inspection device, quantitative evaluation data corresponding to the efficiency of the automatic inspection may be obtained according to an inspection result output by the defect inspection device. For example, the processor 103 may obtain original data according to the inspection result output by the defect inspection device and generate evaluation data corresponding to the efficiency of the automatic inspection according to the original data. For example, the evaluation data corresponding to the efficiency of the automatic inspection may also include at least one of consistency information, accuracy information, skip rate information and overkill rate information, which may be recorded in the table information 310 in the same or a similar way.

In the quantitative difference analysis between the efficiency of the manual inspection and the efficiency of the automatic inspection, the processor 103 may compare the evaluation data corresponding to the efficiency of the manual inspection to the evaluation data corresponding to the efficiency of the automatic inspection. For example, the processor 103 may compare at least one of consistency information, accuracy information, skip rate information and overkill rate information in the evaluation data corresponding to the efficiency of the manual inspection to that of the evaluation data corresponding to the efficiency of the automatic inspection, so as to obtain quantitative difference information. The quantitative difference information may be configured to evaluate a defect inspection ability of one or more automatic defect inspection devices. For example, the quantitative difference information may reflect a difference between the skip rates and/or other quantitative information between the efficiency of the automatic inspection and the efficiency of the manual inspection. For example, if it is assumed that a skip rate of the efficiency of the automatic inspection is 20% and a skip rate of the efficiency of the manual inspection is 22%, then the quantitative difference information may reflect that a skip rate difference between the efficiency of the automatic inspection and the efficiency of the manual inspection is 2% and the efficiency of the automatic inspection is better than the efficiency of the manual inspection.

In an embodiment, comparing to evaluating the efficiency of the automatic inspection for the defect pattern of a specific automatic defect inspection device merely based on the inspection accuracy of this specific automatic defect inspection device itself, the operation of comparing the efficiency of the automatic inspection for the defect pattern to the efficiency of the manual inspection for the defect pattern may obtain an evaluation result meeting the actual situation. It is noted that, the quantitative difference analysis between the efficiency of the automatic inspection and the efficiency of the manual inspection may be performed by the processor 103 or by other computer device, which is not limited by the disclosure.

Figure 4:
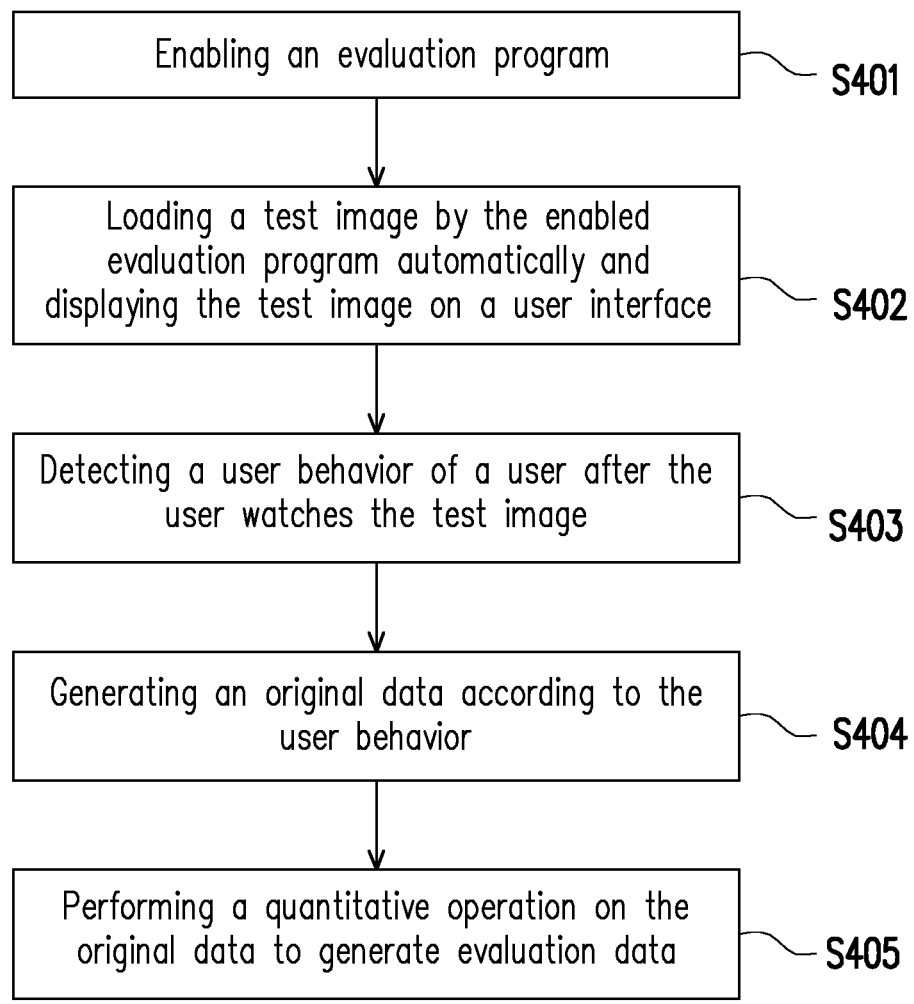
FIG. 4 is a flowchart of a method for evaluating an efficiency of a manual inspection for a defect pattern according to an embodiment of the disclosure.

FIG. 4 is a flowchart of a method for evaluating an efficiency of a manual inspection for a defect pattern according to an embodiment of the disclosure. Referring to FIG. 4, in step S401, an evaluation program (e.g., the evaluation program 1041 of FIG. 1) is enabled. In step S402, a test image (e.g., the test image 210 of FIG. 2) is automatically loaded by the enabled evaluation program and the test image is displayed in a user interface (e.g., the user interface 21 of FIG. 2). In step S403, a user behavior of a user is detected after the user watches the test image. In step S404, original data is generated according to the user behavior. The original data reflects whether the user identifies a defect pattern in the test image and/or a type of the defect pattern identified by the user. In step S405, a quantitative operation is performed on the original data to generate evaluation data corresponding to the efficiency of the manual inspection. The evaluation data reflects an evaluation result corresponding to the efficiency of the manual inspection for the defect pattern.

Nevertheless, each step of FIG. 4 has been described as above and will not repeated hereinafter. It is should be noted that each step illustrated in FIG. 4 may be implemented as a plurality of program codes or circuits, which is not limited in the disclosure. Additionally, the methods illustrated in FIG. 4 may be implemented together with the embodiments above or may be performed solely, and the disclosure is not limited thereto. In an embodiment of FIG. 1, the processing circuit 103 and the storage circuit 104 may be implemented as at least one function module (also referred to as an efficiency evaluation module). The efficiency evaluation module may include a software module, a firmware module and/or a hardware module configured to perform each step of FIG. 4. Related operation are mentioned above and not to be repeated hereinafter.

On the basis above, the efficiency of the manual inspection for the defect pattern may be quantitatively evaluated according to embodiments of the disclosure. Furthermore, the generated evaluation data may be further used in comparison and analysis with the efficiency of the automatic inspection for the defect pattern. From another aspect, the efficiency evaluation data of the manual inspection for the defect pattern provided by the disclosure may be configured as the basis for evaluating the efficiency of the automatic inspection for the defect pattern. Comparing to evaluating the efficiency of the automatic inspection for the defect pattern merely based on the correct answers, the comparison result obtained by comparing the efficiency of the automatic inspection to the efficiency of the manual inspection provides higher reference value on the selection, the design and the improvement of the automatic defect inspection device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for evaluating an efficiency of a manual inspection for a defect pattern, comprising:
    enabling an evaluation program;
    loading a test image automatically by the enabled evaluation program and displaying the test image in a user interface;
    detecting a user behavior of a user after the user watches the test image;
    generating original data according to the user behavior, wherein the original data reflects at least one of whether the user identifies the defect pattern in the test image and a type of the defect pattern identified by the user; and
    performing a quantitative operation on the original data to generate evaluation data corresponding to the efficiency of the manual inspection, wherein the evaluation data reflects an evaluation result corresponding to the efficiency of the manual inspection.

2. The method according to claim 1, wherein the test image comprises a non-defect image and a defect image, the defect image comprises the defect pattern, and the non-defect image does not comprise the defect pattern.

3. The method according to claim 2, wherein a ratio of a number of the defect image to a number of the non-defect image is 30% to 60%.

4. The method according to claim 1, wherein the step of loading the test image automatically by the enabled evaluation program comprises:
    selecting a test image set which comprises a plurality of candidate test images; and
    selecting a first candidate test image from the candidate test randomly and serving the selected first candidate test image as the test image to be loaded.

5. The method according to claim 1, wherein the step of detecting the user behavior of the user after the user watches the test image comprises:
    displaying at least one operation object in the user interface; and
    detecting the user behavior corresponding to the at least one operation object by an input/output device.

6. The method according to claim 1, further comprising:
    providing time information which reflects an answering remaining time corresponding to the test image.

7. The method according to claim 1, wherein the evaluation data comprises at least one of consistency information, accuracy information, skip rate information and overkill rate information.

8. The method according to claim 1, wherein the evaluation data is configured to be used in a quantitative difference analysis with an efficiency of an automatic inspection of the defect pattern.

9. The method according to claim 1, wherein the defect pattern reflects a defect on a surface of a workpiece, and the workpiece comprises at least one of a semiconductor chip, a wafer, a panel and a circuit board.

10. A system for evaluating an efficiency of a manual inspection for a defect pattern, comprising:
    a display;
    a memory; and
    a processor, coupled to the display and the memory,
    wherein the processor enables an evaluation program,
    the enabled evaluation program loads a test image to the memory automatically,
    the display displays the test image in a user interface,
    the processor detects a user behavior of a user after the user watches the test image,
    the processor generates original data according to the user behavior, wherein the original data reflects at least one of whether the user identifies the defect pattern in the test image and a type of the defect pattern identified by the user, and
    the processor performs a quantitative operation on the original data to generate evaluation data corresponding to the efficiency of the manual inspection, wherein the evaluation data reflects an evaluation result corresponding to the efficiency of the manual inspection.

11. The system according to claim 10, wherein the test image comprises a non-defect image and a defect image, the defect image comprises the defect pattern, and the non-defect image does not comprise the defect pattern.

12. The system according to claim 11, wherein a ratio of a number of the defect image to a number of the non-defect image is 30% to 60%.

13. The system according to claim 10, wherein the operation of loading the test image to the memory automatically by the enabled evaluation program comprises:
 selecting a test image set which comprises a plurality of candidate test images; and
 selecting a first candidate test image from the candidate test randomly and serving the selected first candidate test image as the test image to be loaded.

14. The system according to claim 10, wherein the operation of detecting the user behavior of the user after the user watches the test image comprises:
 displaying at least one operation object in the user interface; and
 detecting the user behavior corresponding to the at least one operation object by an input/output device.

15. The system according to claim 10, wherein the processor further provides time information which reflects an answering remaining time corresponding to the test image.

16. The system according to claim 10, wherein the evaluation data comprises at least one of consistency information, accuracy information, skip rate information and overkill rate information.

17. The system according to claim 10, wherein the evaluation data is configured to be used in a quantitative difference analysis with an efficiency of an automatic inspection of the defect pattern.

18. The system according to claim 10, wherein the defect pattern reflects a defect on a surface of a workpiece, and the workpiece comprises at least one of a semiconductor chip, a wafer, a panel and a circuit board.

* * * * *